United States Patent
Muchsel et al.

(10) Patent No.: US 9,311,255 B2
(45) Date of Patent: Apr. 12, 2016

(54) MULTI-LAYER CONTENT PROTECTING MICROCONTROLLER

(71) Applicant: Maxim Integrated Products, Inc., San Jose, CA (US)

(72) Inventors: Robert Michael Muchsel, Addison, TX (US); Donald W. Loomis, Coppell, TX (US); Edward Tang K. Ma, Plano, TX (US); Mark Alan Lovell, Lucas, TX (US); Michael Anthony Quarles, Canton, GA (US)

(73) Assignee: Maxim Integrated Products, Inc., San Jose, CA (US)

( * ) Notice: Subject to any disclaimer, the term of this patent is extended or adjusted under 35 U.S.C. 154(b) by 0 days.

(21) Appl. No.: 14/022,083

(22) Filed: Sep. 9, 2013

(65) Prior Publication Data
US 2014/0040584 A1 Feb. 6, 2014

Related U.S. Application Data

(62) Division of application No. 12/257,339, filed on Oct. 23, 2008, now Pat. No. 8,555,015.

(51) Int. Cl.
*G06F 11/30* (2006.01)
*G06F 12/14* (2006.01)
*G06F 21/71* (2013.01)

(52) U.S. Cl.
CPC ........ *G06F 12/1408* (2013.01); *G06F 12/1491* (2013.01); *G06F 21/71* (2013.01)

(58) Field of Classification Search
CPC . G06F 21/73; G06F 12/1408; G06F 12/1491; G06F 21/07; G06F 12/14911; G06F 21/71; H04L 63/105
USPC ............ 713/189, 167, 193–194, 190; 380/46, 380/277; 711/163, E12.091, E12.092, 711/E12.097, 13
See application file for complete search history.

(56) References Cited

U.S. PATENT DOCUMENTS 5,504,814 A * 4/1996 Miyahara .................... 726/4
6,003,133 A 12/1999 Moughanni
(Continued)

FOREIGN PATENT DOCUMENTS

| EP | 1742152 A1 | 1/2007 |
| EP | 1884873 A2 | 2/2008 |
| WO | 2008086611 A1 | 7/2008 |

OTHER PUBLICATIONS

Intel Corp. "IA-32 Intel R Architectire Software Developer's Manual," System Program Guide, vol. 3, Intel, Jun. 2, 2003, Web, Mar. 5, 2013. <flint.cs.yale.edu/cs422/doc/24547212.pdf>.
(Continued)

*Primary Examiner* — Saleh Najjar
*Assistant Examiner* — Feliciano Mejia
(74) *Attorney, Agent, or Firm* — North, Weber & Baugh LLP

(57) ABSTRACT

The present invention relates to a microcontroller designed for protection of intellectual digital content. The microcontroller includes a secure CPU, a real-time cipher, and a user programmable multi-layer access control system for internal memory realized by programmable nonvolatile memory. Programmable nonvolatile memory allows in-system and in-application programming for the end user. The programmable nonvolatile memory is mainly used for program code and operating parameter storage. The multiple-layer access control is an integral part of the CPU, providing confidentiality protection to embedded digital content by controlling reading, writing, and/or execution of a code segment according to a set of user-programmed parameters. The cipher incorporates a set of cryptographic rules for data encryption and decryption with row and column manipulation for data storage. All cryptographic operations are executed in parallel with CPU run time without incurring additional latency and delay for system operation.

10 Claims, 9 Drawing Sheets

(56) References Cited

U.S. PATENT DOCUMENTS

| | | | |
|---|---|---|---|
| 6,792,528 B1* | 9/2004 | Hou | 380/57 |
| 6,845,159 B1* | 1/2005 | Domstedt et al. | 380/44 |
| 6,952,778 B1* | 10/2005 | Snyder | 726/4 |
| 7,092,400 B2 | 8/2006 | Malzahn | |
| 7,124,170 B1 | 10/2006 | Sibert | |
| 7,631,160 B2 | 12/2009 | Strongin | |
| 7,936,875 B2 | 5/2011 | Sozzani | |
| 8,468,364 B2* | 6/2013 | Goto | 713/187 |
| 2001/0037450 A1 | 11/2001 | Metlitski | |
| 2003/0084308 A1* | 5/2003 | Van Rijnswou | 713/189 |
| 2004/0163013 A1 | 8/2004 | Watt | |
| 2006/0059374 A1 | 3/2006 | Hameau | |
| 2006/0107032 A1 | 5/2006 | Paaske | |
| 2006/0265544 A1 | 11/2006 | Rudelic | |
| 2007/0050580 A1 | 3/2007 | Lewis | |
| 2008/0112561 A1 | 5/2008 | Kim | |
| 2008/0155258 A1 | 6/2008 | Obereiner | |
| 2008/0163353 A1 | 7/2008 | Conti | |
| 2008/0184220 A1 | 7/2008 | Chen | |
| 2009/0259846 A1 | 10/2009 | Watt | |

OTHER PUBLICATIONS

PCT International Search Report and Written Opinion mailed Apr. 8, 2010, in PCT/US2009/059130.

Office Action dated Jan. 8, 2014, in related Taiwan Patent Application No. 098134676.

Office Action dated May 16, 2014, in related Chinese Application No. 200980142513.3.

* cited by examiner

| Memory Segment | Segment Boundaries | | Max Privilege Level |
|---|---|---|---|
| | First Flash Page | Last Flash Page | |
| System | 0 | ULDR-1 | HIGH |
| User Loader | ULDR | UAPP-1 | MEDIUM |
| User Application | UAPP | Top of Flash | LOW |
| ROM | N/A | | HIGH |
| Data Memory (RAM) | N/A | | LOW |

FIG. 3

| Level | PSYW System Write | PSYR System Read | PULW User Loader Write | PULR User Loader Read |
|---|---|---|---|---|
| HIGH | 1 | 1 | 1 | 1 |
| MEDIUM | 0 | 0 | 1 | 1 |
| LOW | 0 | 0 | 0 | 0 |

FIG. 6

MULTI-LAYER CONTENT PROTECTING MICROCONTROLLER

CROSS REFERENCE TO RELATED PATENT APPLICATIONS

The present application is a divisional of copending U.S. patent application Ser. No. 12/257,339, titled "Multi-Layer Content Protecting Microcontroller," filed Oct. 23, 2008, by Robert Michael Muchsel, Donald W. Loomis, Edward Tang K. Ma, Mark Alan Lovell, and Michael Anthony Quarles, which application is hereby incorporated herein by reference in its entirety.

BACKGROUND

A. Technical Field

The present invention relates generally to microcontrollers, and more particularly, to technologies that enable protection of content, such as intellectual property elements, stored with a microcontroller. Microcontrollers with these features are commonly referred to as secure microcontrollers.

B. Background of the Invention

Content protection within a processor or microcontroller has been a challenge for the electronic industry for some time. As semiconductor technology has advanced, certain microcontrollers have become complex systems-on-chip. Critical system functions previously implemented in hardware can now be implemented in software, allowing Original Equipment Manufacturers ("OEMs") to rapidly provide high-value, low-cost microcontroller solutions to a market. For example, programmable nonvolatile memory-based microcontrollers allow frequent system updates, including code modifications and the addition of new functions by numerous application/content providers to the microcontroller.

Oftentimes, these code modifications and/or new functions may represent valuable intellectual property owned by the provider and may be susceptible to unauthorized access by other parties. Additionally, software implementations within a microcontroller are typically easier to reverse-engineer than hardware. As a result, nonvolatile memory-based electronic devices may include hardware data protection that attempts to secure this intellectual property within the electronic device.

Microcontrollers typically include a storage area reserved for access control information in accordance with the data area in a nonvolatile memory. The data area can be arranged either as a single entity containing all memory cells for data storage or in a plurality of memory segments according to the physical structure of the memory array. In prior art systems, access control to a particular segment is enforced by hardware. Program code can be executed by the processor, but read and write operations are prohibited because of the control setting. Typically, the only way to cancel this protection is to first erase both the protected program code and its corresponding access control information.

This approach provides effective data protection but also incurs significant cost overhead in terms of extra memory areas for control information and CPU time in erasure and reprogramming, even for a minor program update. Overhead in CPU time not only decreases system efficiency, it also increases program management complexity.

This simple security arrangement but rigid formation imposes too many restrictions and may be a burden on the end-user. As program codes for microcontroller operation become more sophisticated and complicated, it may be advantageous to use available software libraries provided by an OEM and other vendors instead of creating a full program from scratch. A software library includes major algorithm routines and specific functions, and is ready for use by subroutine calls. Such a software library represents significant value as intellectual property ("IP") to the end products. Furthermore, program development may involve different developers at different development stages, with the possibility of off-shore support and maintenance. This multi-layer program development and multi-developer participation therein results in a complex environment in which securely maintaining proprietary IP content is difficult.

Current access control schemes also lack direct readout of operating parameters in the program memory space. Operating parameters are normally set during system initialization and stored as data tables in nonvolatile memory so data can be retained in case of power loss. It is common practice to store these critical parameters in the same nonvolatile memory with the system program(s) of the microcontroller. If the protected program area is only for execution and prohibits the reading of data, then the reading of operating parameters can be an issue.

The above limitations present a challenge for IP protection in systems-on-chip, especially for low-cost but highly integrated electronic systems such as secure microcontrollers.

SUMMARY OF THE INVENTION

The present invention relates to a microcontroller that provides multi-layer protection of proprietary digital content. Various embodiments of the microcontroller include a secure CPU, a real-time cipher, and a user-programmable multi-layer access control system of programmable nonvolatile memory within the microcontroller. Programmable nonvolatile memory allows in-system and in-application programming for the end-user and is capable of retaining data content when power is removed.

Multi-layer access control is provided in or with the microcontroller and enables confidentiality protection to embedded digital content by controlling reading, writing, and/or execution of a code segment according to a set of user-programmed parameters. In certain embodiments, a cipher incorporates a set of cryptographic rules for data encryption and decryption with row and column manipulation for data storage. In some embodiments of the invention, cryptographic operations are executed in parallel with CPU runtime without incurring significant additional latency and delay for system operation.

Certain features and advantages of the present invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. 3 is a table describing the program memory boundaries and privilege levels according to various embodiments of the invention.

FIG. 6 is a table of the privilege register levels for a three memory segment according to various embodiments of the invention.

DETAILED DESCRIPTION OF THE PREFERRED EMBODIMENTS

Embodiments of the present invention provide systems, devices and methods for secure microcontrollers. In the following description, for purposes of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily all referring to the same embodiment.

A. Secure Microcontroller

A secure microcontroller comprising core and functional elements with security and protection functions is described according to various embodiments of the invention. The protection functions may be part of the microcontroller core that incorporates a control protocol for memory access in accordance with the read/write privilege of each memory segment defined by the system programmer. The control protocol may be enforced by hardware coupled with a memory management unit and program routines residing in utility ROM. Utility functions may include a secure loader for system programming and an in-circuit debugger for program code development. To add protection to the embedded program code, data contents and memory locations may be scrambled at run-time by a hardware cipher in accordance with certain embodiments of the invention. As a result, one or more program(s) may be built within a microcontroller by multiple developers while securing each developer's proprietary content within the microcontroller. In various embodiments, each developer's proprietary content, stored within a microcontroller, is assigned particular access rights that limit and/or block the access of this content by other parties.

Figure 1:
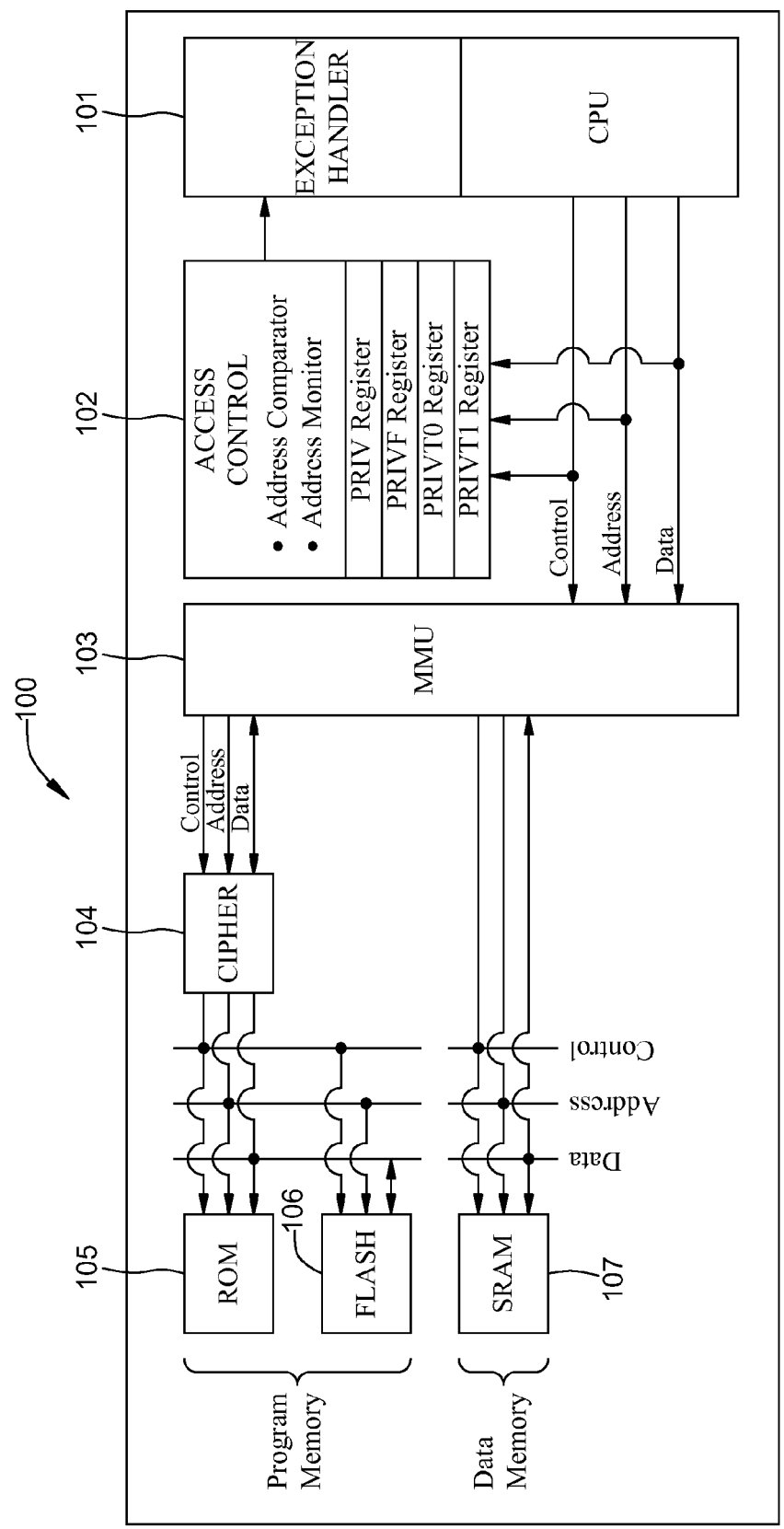
FIG. 1 illustrates an intellectual property content-protecting microcontroller (or secure microcontroller) block diagram according to various embodiments of the invention.

FIG. 1 is a block diagram of a secure microcontroller 100 according to various embodiments of the invention. As shown in FIG. 1, a microcontroller core 101 includes a central processing unit ("CPU") and an Exception Handler. The CPU is also called a "processor unit". In certain embodiments of the invention, the CPU of the microcontroller core 101 is implemented as a pipelined processor which allows a single clock cycle for program code pre-fetch. Hence, an instruction word causes an instruction to be executed in a single clock cycle. This allows for higher system clock frequencies with program memory that has long access times, such as flash memory. Code execution is still single cycle for linear code, but code branching incurs a single clock cycle penalty unless further measures are implemented such as a branch prediction unit. An instruction code operation generally comprises a number of cycles of code execution that defines a specific function. Additionally, the terms "code", "program code" and "instruction code" are considered synonymous.

In various embodiments, the processor uses the Harvard memory architecture with separate program and data memories. This memory architecture improves system bandwidth by allowing simultaneous access to program and data memories; it also permits using different word lengths for data storage. For example, both program memory addresses and data memory addresses may be 16 bits. The 16-bit effective address supports 65536 (64K) 16-bit words of program memory and 64K 16-bit words of data memory. To allow access to data tables stored in program memory, the processor also supports a Von-Neumann-style access, but this access incurs a 1-cycle stall unless an instruction cache is implemented. One skilled in the art will recognize that various processor architectures, clocking schemes, and addressing methods may be implemented in accordance with embodiments of the invention.

The Exception Handler is part of the microcontroller core 101 and functions to cause interruptions to the normal program flow, if unexpected or expected events or conditions occur. For example, an improper attempt to access secure content by an unauthorized user may generate an interrupt that effectively prevents such an access.

Program memory stores content, which may include program code and operating parameters. The main program memory may be implemented using nonvolatile memory, such as flash memory 106 or EEPROM.

A ROM 105 is also mapped to the program space to support utility functions that do not require in-system programmability such as a bootstrap loader function, in-circuit debugging, and chip testing. To ensure proper operation, erase and write to programmable nonvolatile memory may be performed by subroutine calls to the utility ROM 105 and are thus only accessible by system code memory. In certain embodiments of the invention, read access to flash memory 106 is one cycle, but the erase and write times are indeterministic since these operations are handled by utility ROM 105 code via a pair of control and data registers.

Data memory stores various types of data within the microcontroller. One skilled in the art will recognize that the data memory can be implemented with a variety of memory technologies, such as SRAM 107.

A feature of the secure microcontroller 100 is its hierarchical multi-layer access control to the program memory. This hierarchy is realized using a physical layer coupled with the Memory Management Unit (MMU) 103, and the Access Control 102, and the security features of the microcontroller core 101. The physical layer includes monitor and comparator circuitries that monitor the program flow continuously in a memory protection mode and control read/write access of the program memory in accordance with user-defined privilege levels for memory segments. In a particular embodiment, the program memory can be divided into three memory segments, providing three access privilege levels for the system. The memory range and the access privilege of each segment can be defined using a set of dedicated registers in the CPU's general purpose register map. In certain embodiments, these registers are user-programmable but their access sequence is enforced by an atomic circuit in the form of a pair of sequence-controlled registers. An atomic operation refers to a set of operations that can be combined so that they appear to the rest of the system to be a single operation with only two possible outcomes: success or failure.

In various embodiments of the invention, the access control will take effect in the memory protection mode when a memory protection enable ("MPE") bit in the system register is set. In certain examples, this system register may only be accessible by program code residing in the highest security memory segment. In this mode of operation, the CPU fetches, decodes and executes program instructions in a normal fashion. The control access circuit monitors the instruction decoder for memory instructions. When a load or a store command is detected, the monitor uses the last program address to determine the present access privilege. The present privilege is then used to test the legitimacy of the source/destination as the comparator checks the pointer address against the segment boundaries. Only authorized read or write accesses, which means accesses allowed under corresponding access privilege(s), will be executed by the CPU. Any unauthorized access attempts will cause an exception or interruption, optionally forcing the program to execute a user-defined program routine in response.

As illustrated in FIG. 1, the microcontroller 100 may also contain a bi-directional hardware cipher 104 that transforms instruction code at runtime for the purpose of protecting the embedded software in accordance with various embodiments of the invention. For strong cryptographic protection, a cipher using a conventional cryptographic algorithm such as Triple-DES or AES may be used. In certain embodiments, the secure microcontroller 100 employs a cipher technique that generates a key stream by permuting instruction addresses with a secret key. The considerations for the cipher technique include:

1. Sufficient Obfuscation:

The ciphering feature results in sufficient obfuscation, which makes it difficult to deduce the plaintext even when knowing that the first flash instruction is from well-known startup code.

2. Low Hardware Impact:

The ciphering feature does not consume excessive resources in terms of area and computation time. Due to low flash memory operation speed, the encrypted code word, which needs to be fetched from flash, should only be used at the last stage of the decipher operation.

3. Reversible Function Supporting Bi-directional Operation:

If there is a $d=fn(s, x, y, z, \ldots)$, there is also an $s=fn^{-1}(d, x, y, z, \ldots)$. This does not mean a true inversion, as there could be several s for any given d, but only one d for any combination of s, x, y, z, . . . If fn( ) is implemented as a "keystream" generator, then $fn^{-1}( ) = fn( )$ except for the last summation.

4. Other Potential Constraints:

There are limitations for the key register size. A size of 64 to 128 bits may be a good compromise between storage size and key strength. Operations can be addition modulo, binary sum, bit select, etc., but some operations may be costly in terms of hardware, for example generic rotate or mod n, where n is not a power of 2. Specialized rotates (with n=0, 1, 2, 3) or hard wired mod 3, mod 5 or mod 7 and similar low-gate count operations may be used.

Figure 7:
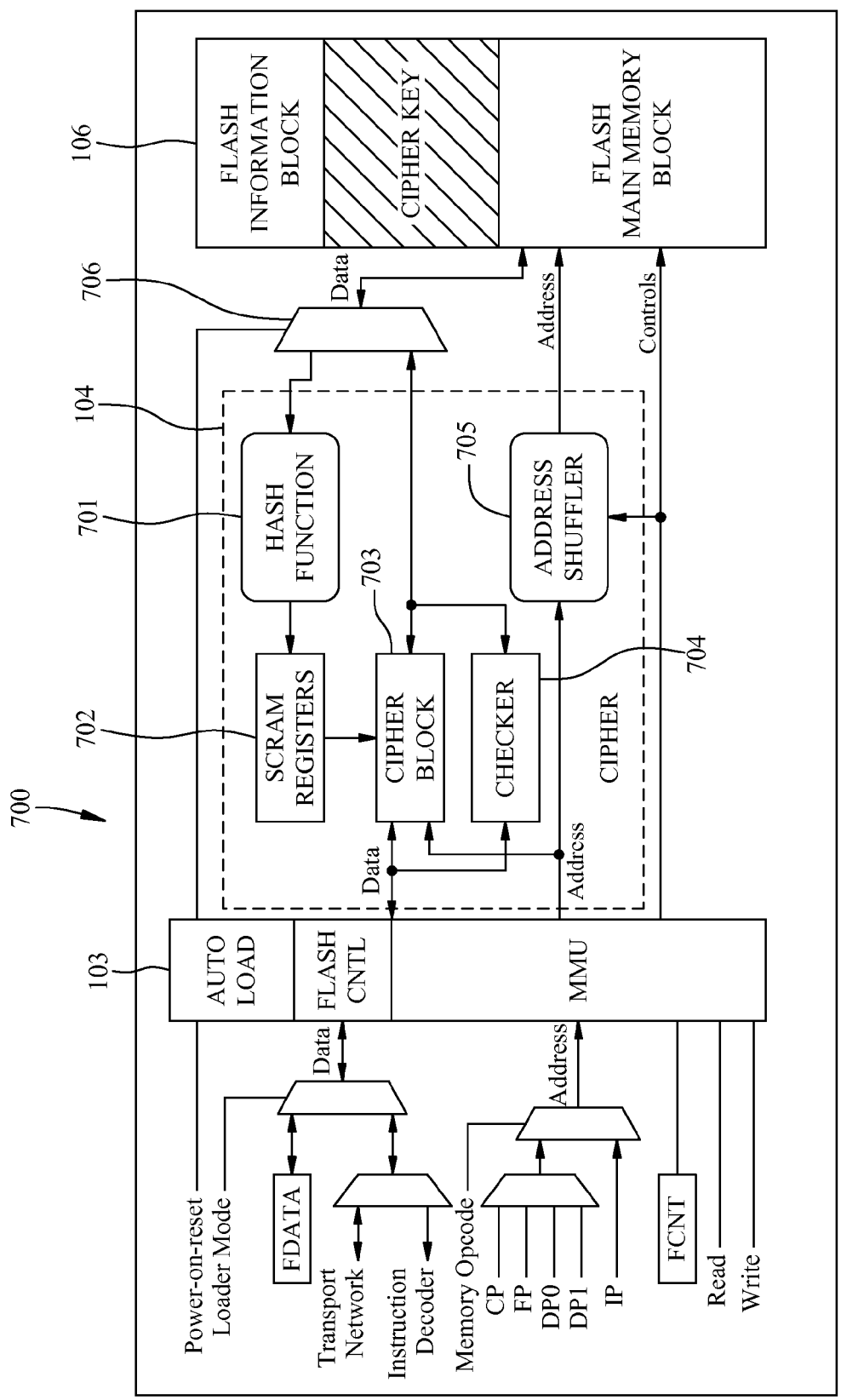
FIG. 7 is a block diagram of the cipher functional blocks and interfaces for various embodiments of the invention.

Referring to FIG. 7, the cipher function and interfaces 700 include a hash block 701 for fast compression of a long pseudorandom sequence for key generation, registers for secret key storage (for example, the cipher key is stored in Flash memory 106), a bit shuffler (address bit shuffler 705) for scrambling memory locations, and a cipher block 703 for ciphering the plaintext code for storage and deciphering the ciphertext code or critical data for execution. In various embodiments, the cipher block 703 works on an instruction-by-instruction basis, taking the address of each instruction and subset of data from the key register to generate a key stream resulting from a sequence of primitive operations. The key stream is then binary-summed with a code word. The cipher may also contain circuitry that checks the incoming and outgoing bit streams for special patterns and determines if it should be by-passed. In certain embodiments, the cipher 104 may be integrated within the MMU 103 since it is implemented in the data path of the program memory and the cipher function is usually enabled.

While the full program space can be protected in memory protection mode, the hardware cipher 104 is usually applied to the main program memory which is realized by a flash memory 106. The ROM 105 mainly contains general utility functions that are usually not secret. The bootstrap loader included in the ROM 105 should not present a security threat even though the bootstrap loader is capable of direct read/write to the flash memory 106, because the loader function is under the access control of the physical layer.

Other embodiments of the secure microcontroller may be realized without the hardware cipher. Although the program code would not be protected within the microcontroller, this system would still have the multi-layer access control security features.

B. Multi-Layer Access Control

The following description of multi-layer access control and memory segmentation within a microcontroller is intended to illustrate certain embodiments of the invention. One skilled in the art will recognize that other access control protocols and memory segmentation architectures may be realized in accordance with embodiments of the present invention.

Figure 2:
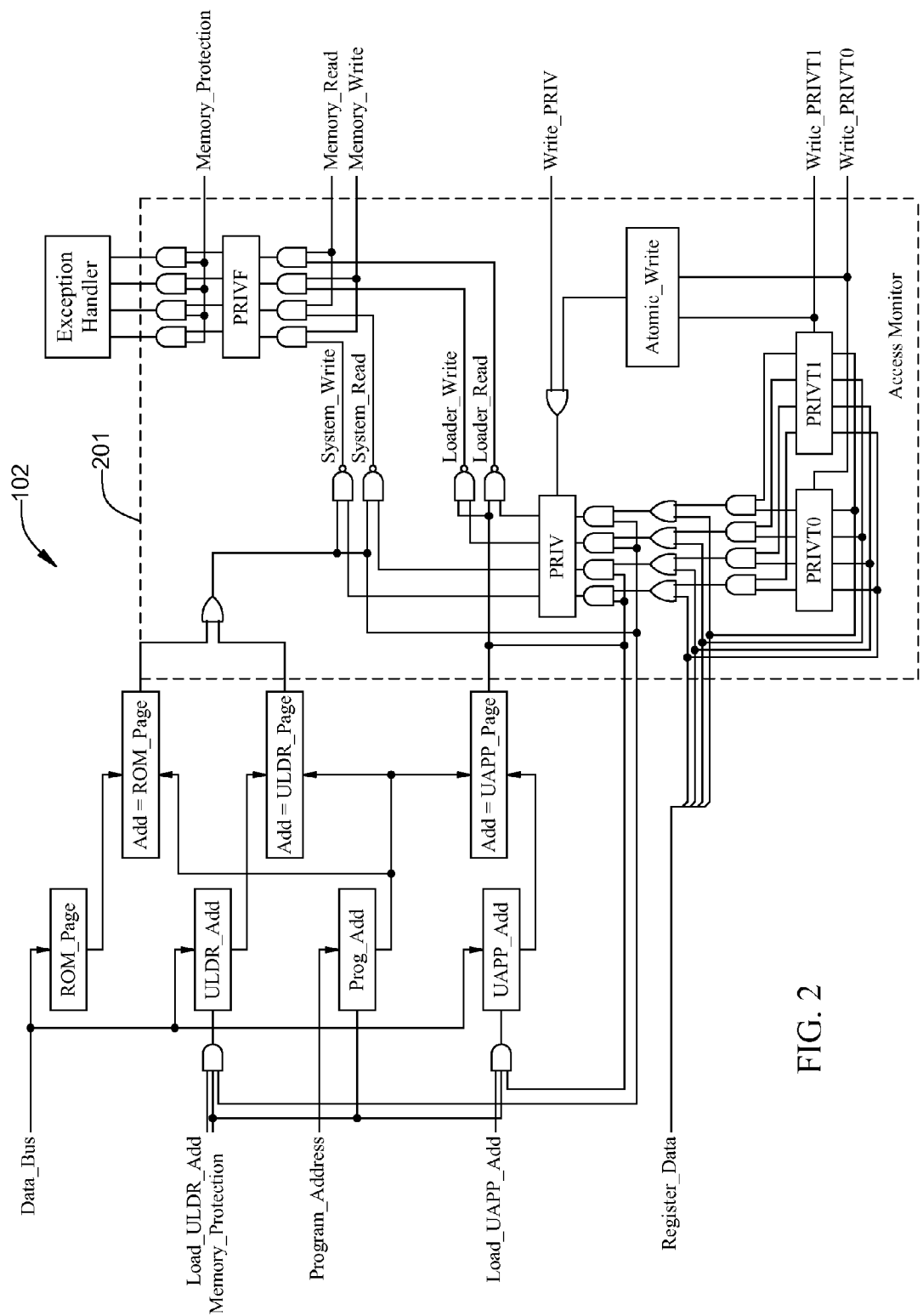
FIG. 2 illustrates a block diagram of the access control and associated circuitry for various embodiments of the invention.

As previously noted, one feature of the secure microcontroller 100 is its hierarchical multi-layer access control for multiple users to the program memory. As shown in FIG. 2, the access control 102 enables the multi-layer access control of the secure microcontroller 100. One element of the access control is the access monitor 201. The access control 102 is coupled to control, address and data signals from the CPU of the microcontroller core 101. The control signals from the CPU may include commands, memory protection, read/write requests, and other signals known to one of skill in the art. The data signals from the CPU may include the data bus signals, register signals and other data signals known to one of skill in the art. In certain embodiments, the data signals are coupled to a bi-directional data bus. The address signal from the CPU may include program address signal and other address signals known to one of skill in the art.

Also shown in the Access Control 102 are the privilege registers, comprising PRIV, PRIVT0, PRIVT1, and PRIVF. These registers store and manage the privilege information related to the privilege level of the user. One skilled in the art will recognize that various types and numbers of privilege registers may be employed to control access of proprietary data/IP within the microcontroller 100.

By monitoring and comparing the operation of the CPU, the access control 102 notifies the Exception Handler by providing a special action, which is required due to a privilege request. In other words, a function of the access control 102 is to manage memory segment level requests, corresponding to privilege levels. In certain embodiments of the invention, elements of access control function may include:

- A control protocol for memory access related to the read/write privilege levels.
- Each of the memory segments corresponds to the privilege level, so that multiple parties, with different privilege levels, can separately load program code, and have write access to the registers of the appropriate privilege level.
- The lesser privilege code cannot change the boundary for a higher privilege level, and the confidentiality of the program code against read/write attempts by lesser privileged code regions is protected.

Figure 4:
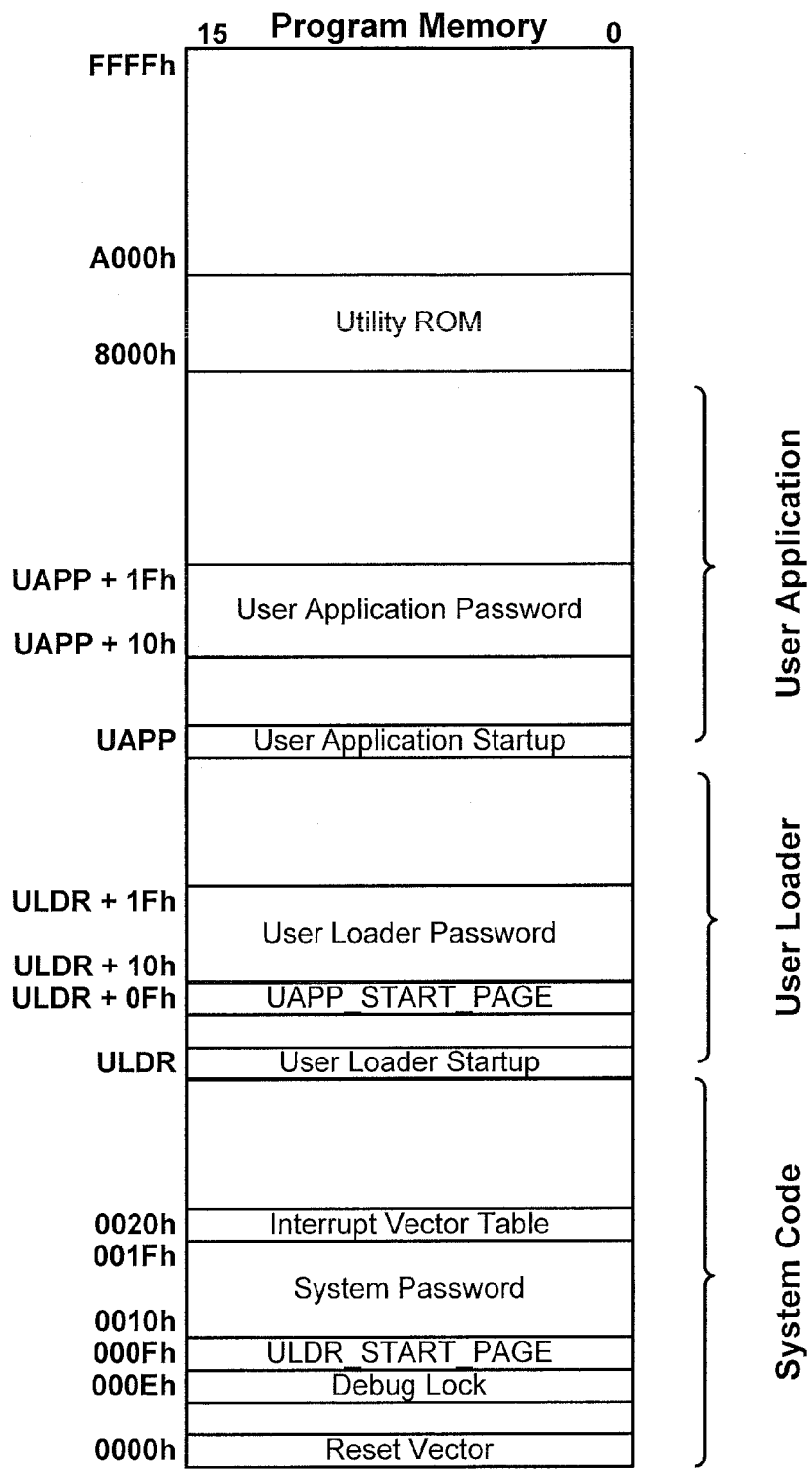
FIG. 4 is a diagram of the program memory segmentation for a three memory segment according to various embodiments of the invention.

The main program memory is stored in the nonvolatile memory 106, and can be viewed as three consecutive memory segments, according to various embodiments. FIG. 4 illustrates a particular program memory segmentation for three memory segments. Instruction codes reside in the program memory and are always executable by the CPU; however, read or write access to each segment is under hardware control in accordance with its privilege level. The three segments defined from highest security to lowest in the secure microcontroller 100 are: System, User Loader, and User Application. The table in FIG. 3 outlines these memory segments, configurable flash page boundaries, and maximum privilege level that may be associated with code execution within the segments according to certain embodiments of the invention. All the privilege levels can be accessed by the read-only-memory code 105.

In various embodiments, the segment boundary is defined in accordance with the page numbers of the flash memory 106. The System segment starts from page 0 to the page ULDR-1, one page below the User Loader segment. In the same fashion, the User Loader segment starts from page ULDR to page UAPP-1 and the User Application segment starts from page UAPP to the top of the flash memory 106.

Each of the three memory segments has a maximum allowable privilege level. The current privilege level assignment is used by hardware as the basis for controlling read/write access to other memory segments. In addition to the three user definable segments, the Utility ROM and data memory regions also have a default maximum privilege level, providing access control to both program and data space. The microcontroller core architecture supports program execution from data RAM by mapping the data memory to the program space. Making data memory a low privilege segment removes the possibility of using the data RAM to circumvent access control.

In certain embodiments of the invention, the Flash page boundaries are configured via the internal registers User Loader Starting Page Address ("ULDR") and User Application Starting Page Address ("UAPP"). Write access to these registers is such that lesser privileged code cannot change the boundary for a higher privileged segment. The values of these registers are multiplied by the number of words per page in order to determine the corresponding address for the first word on the specified page. For example, ULDR*256 is the address for the first word on page ULDR when the number of words in a Flash page is 256.

To make these critical values nonvolatile, the values of ULDR and UAPP are stored in the flash memory 106 during segment initialization. If a User Loader segment is preferred, the ULDR value must be programmed in the System segment and the System Code is responsible for transferring the ULDR value to the ULDR register in case of power-on reset. The same is applied to the User Application segment. The UAPP value is programmed in the User Loader segment and must be transferred to the UAPP register by the User Loader.

Figure 5:
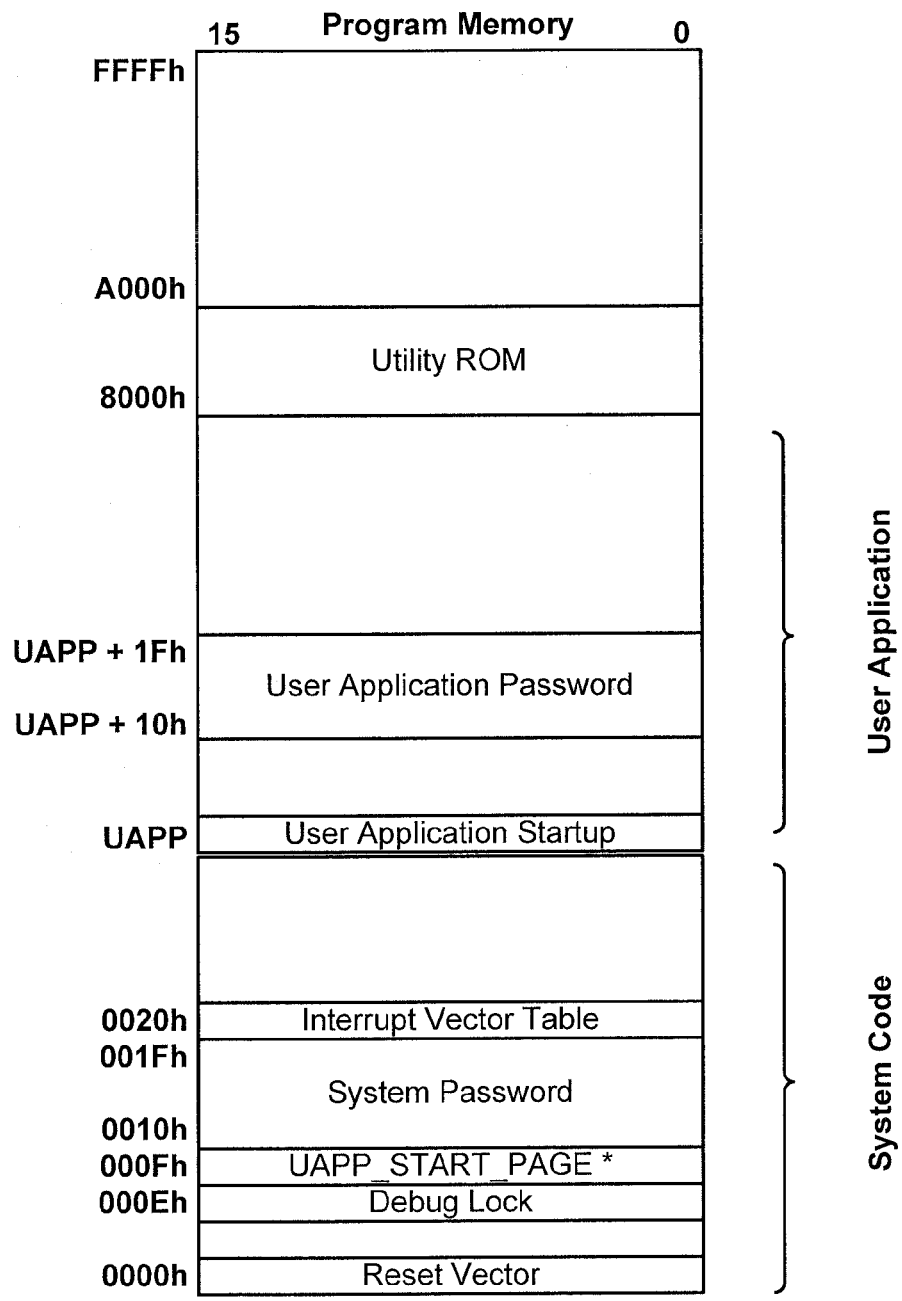
FIG. 5 is a diagram of the program memory segmentation for a two memory segment according to various embodiments of the invention.

In various embodiments of the invention, the flash page boundary in FIG. 3 leaves open possibilities for segmentation options that may not be created by the user code. When program memory segmentation and protection are enabled (e.g., MPE=1), the system code segment should be inclusive of the first flash memory page. This means that the ULDR and UAPP registers are not programmed to 0. If it is desired that the program memory be comprised of only two program memory segments, the ULDR register and UAPP register are programmed to define the same starting page, thus no pages are defined within the ULDR segment. If the ULDR register is programmed to a value equal to or greater than UAPP, no User Loader segment is defined. The UAPP register can be programmed to the starting page for the second region. In this situation (only two program memory segments), the last page of system code memory will be (UAPP-1), as illustrated in FIG. 5. In certain situations, this is preferred over using User Loader as the second memory region so that only HIGH and LOW privilege levels are available.

This segmentation of program memory is provided in order to facilitate the loading of program code by multiple parties at different stages during the product life cycle (e.g. original vendor, second user, end user upgrades and library downloads). The segmentation and privilege scheme also provides a mechanism for protecting the confidentiality of code against read/write access attempts by lesser privileged code regions. In certain embodiments, the ability to read utility ROM is typically allowed, independent of the MPE bit state.

In the following sections, examples will be provided for both a two segment and three segment multi-layer access control system. However, one skilled in the art will recognize that embodiments with greater that three memory segments are within the scope of the present invention.

C. System Code Segment

In certain embodiments of the invention, the highest privilege level, and also the highest security level, is the System or System Code segment, as noted in FIG. 3. Typically, the System Code is only available to the original vendor of the microcontroller product. For a three segment or two segment embodiment, an exemplary System Code is illustrated in FIGS. 4 and 5, respectively.

In certain embodiments, the System Code begins on a certain page and extends to the page just prior to the starting page of the User Loader Starting Page. The ULDR register, which defines the top of the System Code region, may be writable by System Code or ROM code. In various embodiments of the invention, a method for initializing the System Code region stores the desired ULDR starting page value at flash word address 000Fh (word just prior to the system password) and have the reset vector code perform the ULDR write as follows:

```
org 0000h
    ; Reset
    move CP, #usr_ldr_page
    move ULDR, @CP
    jump sys_init
org 000Fh
user_ldr_page:
    ; Starting page address of user loader
    dw 0020h ; Page 32
org 0010h
    ; System password
    dw ..., ..., ..., ...
```

However, other methods for initializing the System Code region may be implemented in accordance with embodiments of the present invention.

In various embodiments of the invention, the read/write accessibility of system code is defined by two register bits in the PRIV privilege register. For example, the system read privilege ("PSYR") bit is set to particular value to allow reading of the System Code region. The system write privilege ("PSYW") bit is set to particular value to allow writing to the System Code region. Both of these bits will automatically be cleared to a value by hardware when the current IP/content is not in ROM code or System Code. If read/write attempts are made to the system region without PSYR/PSYW being enabled, memory protection interrupt flags (e.g., PSYRF and PSYWF) will be set for read and write attempts respectively. If the MPE bit is set, these interrupt flags will alter the normal program flow to execute a user defined subroutine to handle the exception.

D. User Loader Code Segment

In certain embodiments of the invention, the medium privilege level, and also the medium security level, is the User Loader code segment, as noted in FIG. 3. Typically, the User Loader code is the highest code available to second users of the microcontroller product. For a three segment embodiment, an exemplary User Loader code segment is illustrated in FIG. 4.

In various embodiments of the invention, the user loader code region typically begins on the ULDR page that is defined by the System Code and extends to the page just prior to the starting page of the User Application starting page. The UAPP register defines the top of the User Loader code region and is not writable by User Application code (i.e. only writable by System Code, User Loader, or ROM code).

In certain embodiments, a method for configuring the User Loader boundary is similar to that which was used by the System Code region. On the first ULDR page, the desired value to be programmed into the UAPP register is placed at word address offset 000Fh, just prior to the User Loader password. The User Loader startup code at the beginning of the ULDR page reads the value stored at ULDR*flash page size+000Fh and write to the UAPP register.

In various embodiments of the invention, the read/write accessibility of User Loader code is defined by two register bits in the PRIV privilege register. For example, a User Loader read privilege ("PULR") bit is set to a particular value to allow reading of the User Loader code region. A User Loader write privilege ("PULW") bit is set to particular value to allow writing to the User Loader code region. Both of these bits may be automatically cleared to 0 by hardware when the current IP is not in ROM code, System Code, or User Loader code. If read/write attempts are made to the User Loader region without being enabled, memory protection interrupt flags (e.g., PULR read privilege flag and PULW write privilege flag) will be set for read and write attempts respectively. If the MPE bit is set, these interrupt flags will alter the normal program flow to execute a user defined subroutine to handle the exception.

E. Two-Segment Memory Configuration

If the scope of a microcontroller application only requires two privilege levels, then a two-segment memory configuration may be used. The two-segment memory confirguration is illustrated in FIG. 5 according to various embodiments of the invention. For devices with only two memory segments, the User Loader memory region is excluded, thus leaving only the system memory region and the User Application memory region.

In certain embodiments, the flash word at address 000Fh that is normally used to supply the value of the starting page for the User Loader is used instead to supply a value for the starting page of the User Application in order to support the two-segment memory configuration. In order for the Utility ROM to contextually know that the aforementioned flash word is meant to supply information about the UAPP starting page instead of the ULDR starting page, the most significant bit in this word may be set to particular bit value. Thus, if System Code is to exclude the User Loader, the following code may be used and the program memory segmentation map would change accordingly.

```
org 0000h
    ; Reset
    move CP, #usr_app_page
    move UAPP, @CP
    move ULDR, UAPP ; set ULDR=UAPP
    jump sys_init
org 000Fh
user_app_page:
    ; Starting page address of user application (no user loader)
    dw 8020h ; Page 32, msbit=1
org 0010h
    ; System password
```

F. User Application Code Segment

In certain embodiments of the invention, the lowest privilege level, and also the lowest security level, is the User Application code segment, as noted in FIG. 3. Typically, the User Application code is the only code available to third users, or an end user for upgrades or library downloads. For a three segment or two segment embodiment, exemplary User Application code is illustrated in FIGS. 4 and 5, respectively.

In certain embodiments of the invention, the User Application code region begins on the UAPP page and extends through the last page of the flash program memory (given that a UAPP code region is defined). The privilege for code execution in the User Application region cannot be greater than "LOW", corresponding to the lowest privilege level, as noted in FIG. 3. Accordingly, there are not any read/write privilege enables or memory protection interrupt flags.

G. Privilege Registers

In certain embodiments of the invention, the privilege registers comprise PRIV, PRIVT0, and PRIVT1, and are noted on FIGS. 1 and 2. FIG. 6 provides a table giving the privilege registers values for three privilege levels, corresponding to a three-segment memory configuration according to various embodiments of the invention. This table applies the privilege registers PRIV, PRIVT0, and PRIVT1. There are two ways to change the privilege level. The PRIV register can be directly read/written under access control. Another way to update the PRIV register value is via the atomic operation, a back-to-back write to PRIVT0 and PRIVT1 registers. That is, a Write PRIVT0 operation is immediately followed by a Write PRIVT1 operation. The last method is recommended in case someone modifies the stack pointer to circumvent access control. Hardware guarantees that the contents of PRIV register are never higher than the maximum privilege level of the memory area the code is running from. For example, if User Loader or User Application code attempts to set PRIV to HIGH, then hardware would prevent this action from occurring. However, any code can decide to lower the privilege level at any time. In certain embodiments of the invention, the privilege for current code execution will be the lesser of:

the maximum privilege level of the memory region in which code is executing, or the content of the PRIV register.

For example, if the PRIV register were configured to MEDIUM privilege, code execution in the System Code region would only be allowed access based upon MEDIUM privilege. In various embodiments of the invention, typical fixed level assignments according to the bit contents of the PRIV register are given in FIG. 6. The constants HIGH, MEDIUM, and LOW are shown, but all values from 0000b to 1111b may be used.

H. Atomic PRIV Write Using PRIVT0 and PRIVT1 registers

According to various embodiments, in addition to direct writes to the PRIV register, the register and privilege level can also be set by writing to PRIVT0 and PRIVT1 registers in a back-to-back sequence. This command is referred to as an Atomic PRIV Write command.

Like the PRIV register, hardware guarantees that the contents of PRIVT0 are never higher than the maximum privilege level of the memory region that code is running from. Writing to the PRIVT0 has no effect on the PRIV register, but writing to the PRIVT1 register will cause hardware to modify the PRIV register to the lesser of:

1. the maximum privilege level of the memory region in which code is executing,
2. the PRIVT0 register, or
3. the source argument for the PRIVT1 write.

The safety benefit in providing that the PRIVT0, PRIVT1 register pair is written in sequence to change the privilege PRIV register, is that code placed between the PRIVT0, PRIVT1 writes may not be intentionally jumped over by someone hoping to gain unauthorized higher privilege. Writing to PRIV may automatically reset PRIVT0 to LOW.

I. Rules for System Software

While privilege levels are implemented in hardware, there are various ways user code could try to circumvent the memory access protection, including the manipulation of shared, common stacks or registers, and jumping or calling to code in system memory that is not an official entry point. According to various embodiments of the invention, the following rules may be applied to provide a safer system and minimize the success of these attacks.

First, the system code does not save and restore the privilege level. Instead, interrupts and system library functions that raise the privilege also unconditionally lower the privilege before exiting. If there are interrupts that lower the privilege level, or interrupt code running outside of system space, code that raises the privilege disables interrupts for the duration of the privileged operation.

Second, an operation that requires high privilege levels does not call subroutines to raise the privilege level. Third, a system library function that checks arguments before raising the privilege level does so in an atomic fashion using PRIVT0 and PRIVT1 to prevent short-circuiting the check (the rule about disabling interrupts applies as well).

One skilled in the art will recognize that other rules for system software may be applied to further ensure the security and integrity of content/IP within the microcontroller.

J. The Bootstrap Loader Function

Figure 9:
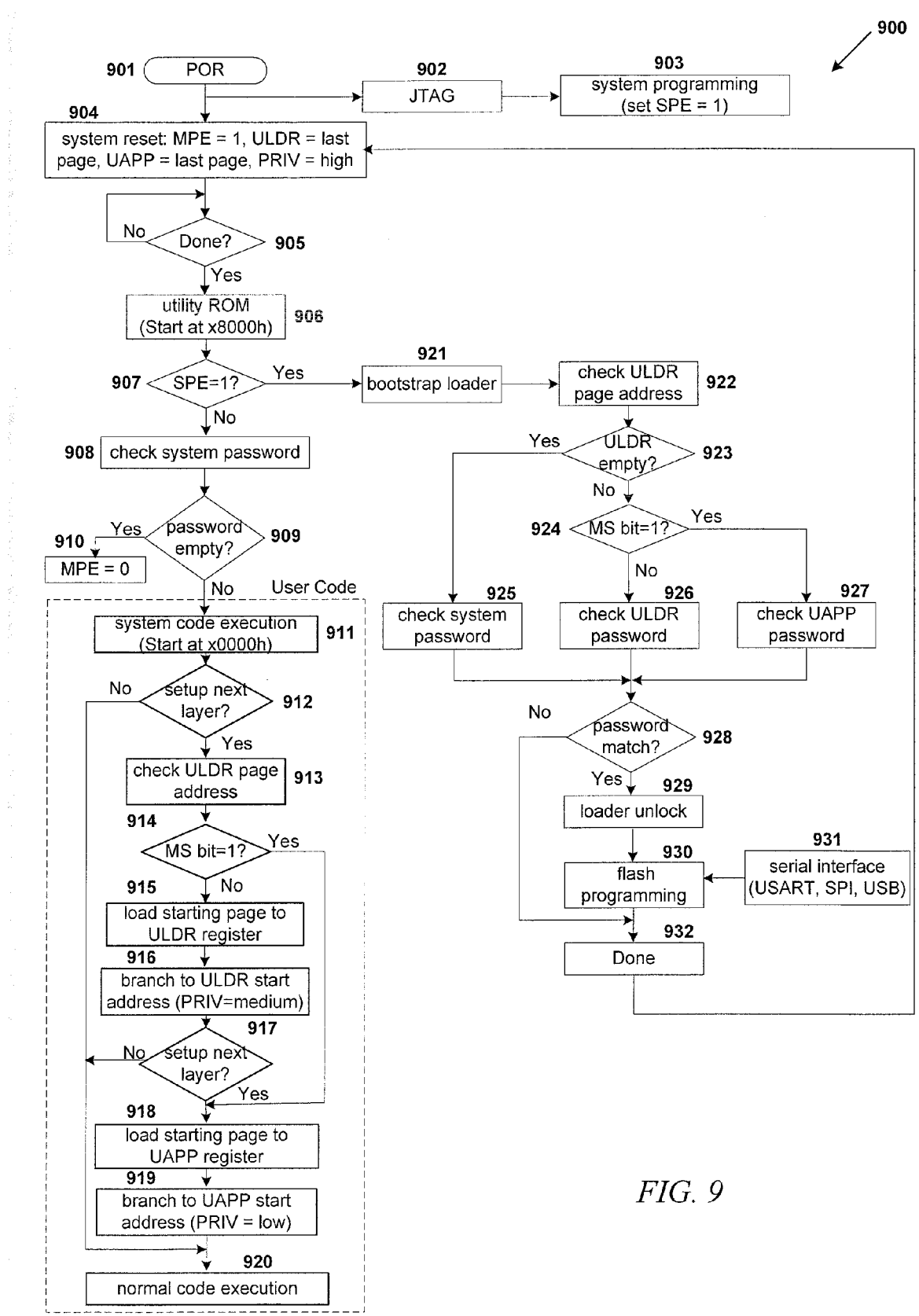
FIG. 9 is a flow diagram illustrating operation of the multilayer access control according to various embodiments of the invention.

The secure microcontroller 100 supports various modes of system operation. In certain embodiments of the invention, the microcontroller 100 is normally running in a user mode to support user applications. A ROM bootstrap loader mode is used for initializing memory and system configuration. The ROM bootstrap loader mode also supports in-application programming and critical system data update with hardware assistance. A flow diagram 900 of an exemplary bootstrap loader operation is shown in FIG. 9.

A bootstrap loader function residing in the utility ROM provides essential support for system initialization and programming according to various embodiments of the invention. Per FIG. 9, following each reset 901, 904, the CPU automatically starts execution at a particular address in the utility ROM 906, allowing utility ROM code to perform necessary system support functions. Next, the System Programming Enable ("SPE") bit is examined 907 to determine whether system programming should commence or whether that code should be bypassed, instead forcing execution to vector to the start of user program code 111. For example, when the SPE bit is set to particular value, the processor will execute the prescribed bootstrap loader mode program 921. The SPE bit may also default to a value.

To enter the bootstrap loader mode 921, the SPE bit can be set to certain value during reset 901 via an interface, such as JTAG 902, 903. The bootstrap loader implements the system programming as described in FIG. 9, steps 922 to 932. These steps include checking the system password 925 and ULDR password 926, 927. Assuming a password match 928, the loader is unlocked 929, and the flash programming 930 is implemented with support from serial interfaces 931 as required. When system programming is complete, the bootstrap loader is capable of clearing the SPE bit and resetting the device such that the system programming routine is subsequently by-passed.

In certain embodiments, the utility ROM segment has a default high security level, hence the bootstrap loader has the highest access privilege and can be called to access any program memory segments, including the information block that is not mapped in the normal program memory space and is not available for general usage.

In various embodiments of the invention, the information block is a small reserved memory segment in Flash memory 106. For the microcontroller core 100, the information block is used for storing user secret data and cipher key data. The user secret is a binary stream and is used for establishing an authenticated connection with a remote secure Loader supported by the Bootstrap Loader via a conventional interface such as USB, UART or SPI. The cipher key is a pseudorandom sequence to be used by the hardware cipher. A lock pattern is also defined in the information block. If the lock pattern is programmed, further access to the information block is prohibited. In certain embodiments, only a mass erase—which erases all data contents in the Flash memory 106—can unlock the lock.

Since the information block is not in the program memory space, read/write access to the information block is through the Flash Control ("FCNT") and Flash Data ("FDATA") registers that are only operational when the CPU is executing from the utility ROM. The security level of the information block defaults to High and hence it is only accessible by system code prior to lock out. Exemplary FCNT and FDATA are illustrated in FIG. 7 according to various embodiments of the invention.

K. The In-Circuit Debug Function

The microcontroller 100 supports various modes of system operations. Normally the microcontroller 100 is running in User mode to support user applications. The Debug mode is intended to provide real time in-circuit debugging/emulation. The Test mode is designed to support in-house chip testing and qualification. Both Debug mode and Test mode are supported through a Test Access Port (TAP) and the TAP controller which is compatible to the JTAG standard.

In various embodiments of the invention, the hardware in-circuit debugger and debug routines residing in the utility ROM 105 are controlled by the access control hardware. The debugger hardware facilities are available for program development and system debugging, but read/write access to program memory follow the privilege level of a specific memory segment.

As the debug features are realized by the debug routines, these software routines observe the access rules. The debugger tracks the calling address and decides on its course of action in accordance with the privilege level of the segment. In certain embodiments, in-circuit emulation and data dump of a higher-privilege memory segment are prohibited. During a trace operation, subroutine calls from a lower privilege segment to a higher privilege segment are allowed, but no intermediate register data will be displayed and no traced code or memory data can be read out. In certain embodiments, the debugger executes a single step. However, there is no intermediate data returned when single stepping a higher privilege level segment.

In various embodiments of the invention, the debugger is disabled when the lock pattern in the information block has been programmed.

L. Typical Startup Code Sequence

During the initialization of microcontroller 100, the device sequences through a number of steps that assure reliable operation, while sequencing through the hierarchy of privilege levels. This initialization procedure is illustrated on the flow diagram 900 of FIG. 9. For various embodiments of the invention, the startup sequence is as follows:

First, the microcontroller 100 will have a power-on-reset ("POR") 901 and will check to see if special programming 902,903 is required, that is, if the SPE bit is asserted. If the SPE bit is asserted, then the bootstrap loader will be engaged (see section J. The Bootstrap Loader Function, and FIG. 9, steps 921 to 932).

If the SPE bit is not asserted, then as a default, the system resets 904 at particular page address, such as 8000h, and starts running ROM code 906. The ULDR and UAPP registers are always set to the last page of the Flash memory 106. For example, for a 64 KB Flash with page size of 512 bytes, ULDR and UAPP are at their reset values of 0080h. For a 128 KB Flash with page size of 512 bytes, ULDR and UAPP are at their reset values of 0100h. The PRIV register is at its reset value of HIGH. The memory protection is enabled (MPE=1) 904.

Next, the ROM initialization code checks the system password 907 and disables MPE 910 if the password is empty 908. After ROM initialization is complete, the ROM passes execution to system code memory at a particular address, such as 0000h 911.

Next, the system code starts executing and uses a particular data pointer, such as 000Fh, to read the user loader starting page address 913 and writes it into the ULDR register 915. After system initialization is complete, system code jumps to address ULDR*Flash page size+a particular page address, such as 0000h. This jump automatically drops PRIV to medium 916.

The user loader code starts executing and uses the data pointer of ULDR*Flash page size+a particular page address, such as 0Fh to read the user application starting page address and writes it into the UAPP register 918. After user loader initialization is complete, user loader code jumps to address UAPP*Flash page size+a particular page address, such as 0000h. This jump automatically drops PRIV to LOW 919. Subsequently, normal code execution will occur 920. One skilled in the art will observe that the aforementioned steps can be adapted to applications with a different number of privileged levels.

M. Hardware Cipher

FIG. 7 illustrates the main functional blocks of the hardware cipher 104 and its interfaces within the microcontroller 100 according to various embodiments of the invention. In certain embodiments, a bi-directional hardware cipher 104 provides additional protection for user program memory against attempts to determine the digital contents. The cipher 104 is only applied to the Flash memory 106 in this particular design but would be applicable to other memory technologies as required.

The cipher 104 is coupled with the MMU 103, intercepting the system address and data buses interfacing the Flash memory 106. The cipher 104 is controlled by the MMU 103 that incorporates special Flash control logic and state machine that automatically transfers selected data from the Flash to local registers. In various embodiments, the cipher comprises five main functional blocks:

1. The Hash Function 701 provides a long pseudorandom sequence and creates a hash digest, based upon the cipher key.
2. SCRAM registers 702 provide an intermediate key stream resulting from further manipulation of the hash digest.
3. The Cipher block 703 provides a bit stream generator for ciphering plaintext data and deciphering cipher text data.
4. The Address Bit Shuffler 705 scrambles the Flash physical memory locations.
5. The Checker 704 "checks" for special data patterns. If these patterns are detected, then special actions are taken.

In various embodiments of the invention, the functional operations are transparent to the user. Except for the auto-load function which is activated during a power-on reset, other operations take place in run time as part of path delay in the fetch cycle of the CPU, including memory access. For the microcontroller 100, this is completed within one clock cycle in certain examples.

1. The Hash Function and the Secret SCRAM Registers

In certain embodiments, the Hash Function 701 is activated during reset triggered by a power-on-reset. The MMU 103 contains a state machine that automatically reads out the cipher key from the Flash information block, located in the Flash memory 106 while holding the system in reset. The Hash block 701 processes a long binary sequence and produces a digest. The digest is stored in the SCRAM Registers 702 which provide the intermediate key sequences to the cipher block 703.

According to various embodiments, the Hash Function 701 implements one of the Secure Hash Algorithms (SHA) that support 512-bit block size for the cipher key. To limit the size of the SCRAM Registers 702, the hash digest is truncated before saving to the SCRAM Registers 702 in the current implementation. When only limited secret storage is available, the Hash Function 701 can be an identity function since the size of the SCRAM registers 701 and the size of the stored secret can be identical. The strength of the SHA algorithms relies on multiple rounds of complicated operations. The lengthy delay is not critical since the SCRAM Registers 702 needs to be updated only for a power-on reset.

Since data stored in the information block is not ciphered, any unused memory locations may be programmed with random data. Additionally, the addresses of the information block can be scrambled, making efforts for revealing user secret and cipher keys more difficult.

2. The Cipher Block

In certain embodiments of the invention, the cipher block 703 is incorporated in-line with the system data bus between the MMU 103 and the Flash memory 106. The system address bus is also coupled to the cipher block 703, providing a physical address with the key sequences for key stream generation. The physical address comes from different sources, depending on the operating mode, either a loader mode or a normal operating mode.

During the loader mode, the physical address is sourced from the FDATA for memory initialization and in-system programming to the Flash memory 106. In this operating mode, the memory routines residing in the utility ROM 105 are called by the Bootstrap Loader or the main program. These memory routines handle user identification, Flash erase and programming protocol, operating sequence and timing. Access control is enforced by hardware and the memory segment privilege. The cipher block 703 is ciphering plaintext code to be stored to the Flash memory 106.

During the normal operating mode, the physical address can be sourced from the Instruction Pointer (IP) or Data Pointers (CP, FP, DP0 or DP1). In normal operation, instruction code is pre-fetched as addressed by the IP. The cipher block deciphers the cipher text code to the decoder for CPU execution. When a read operation is decoded, the physical address is retrieved from the active data pointer to read out Flash data. The cipher bock also deciphers the cipher text data to the destination register via the transport network. Access control is enforced by hardware and the memory segment privilege. A write operation is accomplished by a subroutine call to the utility ROM 105 just like in Loader mode.

Figure 8:
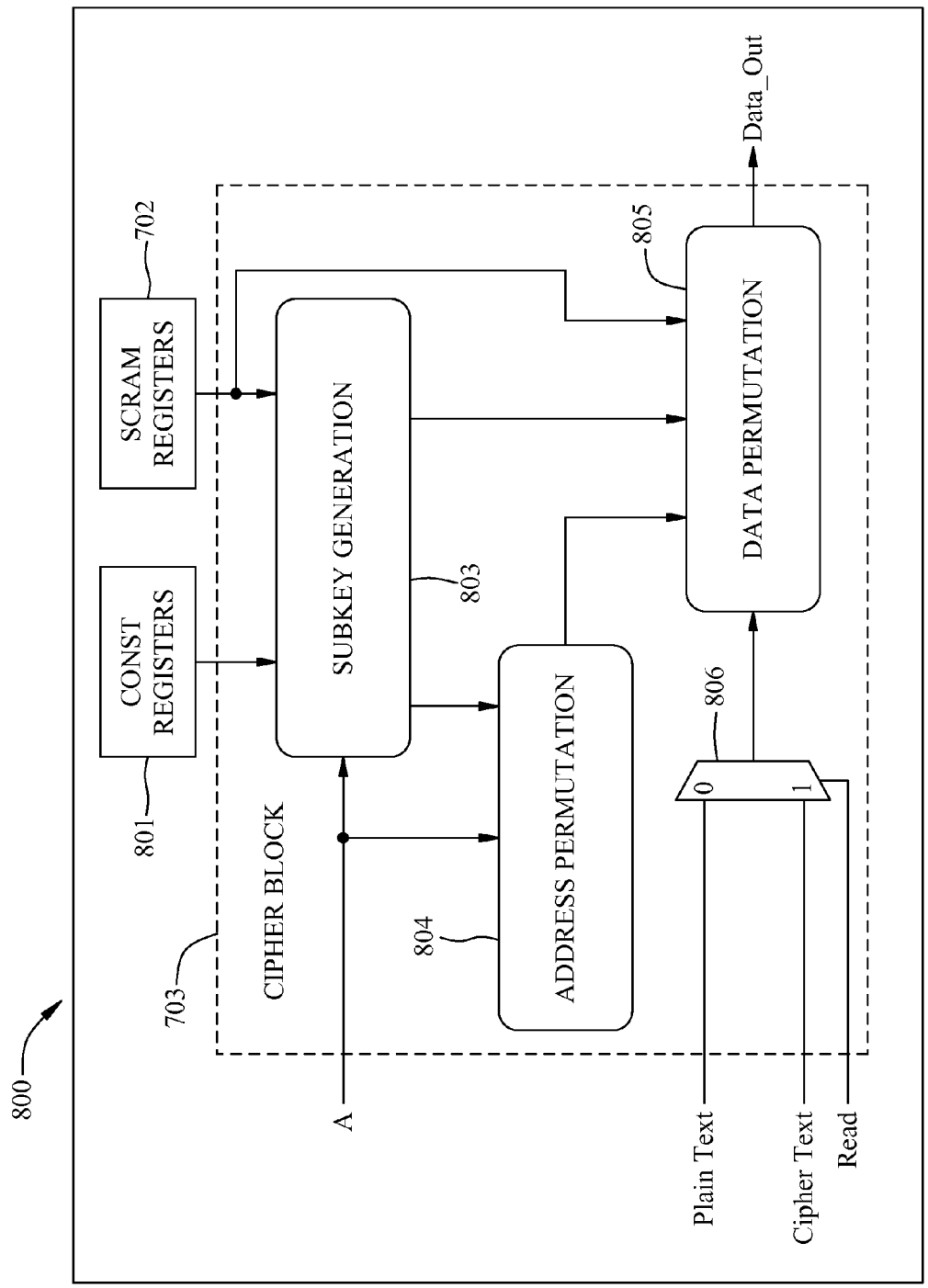
FIG. 8 is a block diagram of the cipher block internal structure according to various embodiments of the invention.

FIG. 8 shows a block diagram 800 that illustrates the basic functions and the data path of the cipher block according to various embodiments of the invention. The SCRAM Registers 702, together with the CONST Registers 801, provide pseudorandom sequences to the cipher block 703 for subkey generation. The SCRAM Registers 702 contain a hash digest, such as a 64-bit hash, produced by the Hash Function 701. The CONST Registers 801 are predetermined randomly chosen numbers hard-wired into the chip. These constants, together with the pseudorandom sequences from the SCRAM Registers 702, effectively form a long pseudorandom sequence and add entropy to the key streams without any hardware adder. This means that one half of the pseudorandom sequence resides in chip-logic, and the other half in nonvolatile memory.

In certain embodiments of the invention, the cipher block 703 takes the physical address of the target instruction word and begins the process using two bit streams generated by the subkey generation block 803. These bit streams are the results of two 64-bit operations controlled by the address bits after a binary sum operation.

The primitive binary operations for key and data permutations are defined as follows:
XOR—Bitwise Exclusive OR
ADD—Addition modulo $2^{16}$
ROL—Rotate left of word
MOD—Eight-bit Modulo
MUX—Multiplexer The address permutation block 804 takes in a subkey and the physical address. The lower byte of the address is first processed through the eight-bit modulo ("MOD") to generate an output for addition modulo $2^{16}$ ("ADD") and rotate left ("ROL") operations. The MOD is basically a sequence of addition operations with a multiplexer for final output selection. The resulting bit stream is used for both address and data transformations. The physical address transformation is a simply binary sum of the bit stream.

The data permutation is a sequence of primitive operations. The data permutation block 805 is illustrated in FIG. 8. A block of multiplexers ("MUX") compresses the subkey supplied from the subkey generator and the bit stream from the address permutation block into a single bit stream. The bit orders of the input to the MUX are rearranged and the selection is dependent on the binary value of the selector bits supplied from the SCRAM Registers 702. This bit stream is further diffused by addition modulo $2^{16}$ operations with the transformed address bit stream. After a ROL bit rotation, the resulting bit stream is binary-summed with data for ciphering or deciphering according to required operation.

3. Address Bit Shuffling

The address bit shuffler 705 is disposed in-line with the physical address bus to add confusion to the memory contents by changing the storage locations according to various embodiments of the invention.

A simple address bit shuffler 705 reorders and possibly inverts the address bits when accessing Flash memory 106. The address bit shuffler 705 can be static. Without shuffling, well known startup code would be at the known location 0000h and interrupt vector code would be at known table address locations. Address bit shuffling can only be done within a Flash page to support in-application programming. The address bit shuffling is only applied to the Flash program memory 106. If address bit shuffling were applied to the utility ROM 105 without code scrambling and with knowledge of utility ROM contents, the shuffling scheme for the Flash could be determined if the same scheme were used.

4. The Checker

The checker block 704 mainly contains comparators to handle special data patterns due to the characteristics of the Flash memory 106. For certain embodiments, there are two special cases as noted below.

In the first case, microcontroller 100 is attempting to program (or leave un-programmed) a Flash word address with the pattern FFFFh. With the ciphering enabled, Flash memory cells at the target word can be programmed to 0, thus requiring erasure before additional programming can be performed to the word. This would not be transparent to the user as the user would expect to be able to program the word that was intentionally left un-programmed. The FFFFh data pattern should not be ciphered or deciphered by the cipher block 703.

Attempting to program a Flash word with a pattern, that when ciphered with the key stream, would result in the FFFFh pattern. Since the FFFFh pattern will not be deciphered, no ciphered version of the FFFFh pattern should be presented in the Flash as this would pose a dilemma in determining the intended pattern in the Flash memory 106. These patterns should not be ciphered or deciphered by the cipher block 703.

In the second case, the checker 704 circuit compares the input and output data of the cipher block 703 against the FFFFh bit pattern:

For write operations, if the plaintext input is FFFFh, FFFFh by-passes the cipher block and is programmed to the Flash memory 106. Alternatively, if the cipher block output is FFFFh, the ciphered data is discarded. The plaintext data by-passes the cipher block 703 and is programmed to the Flash memory 106.

For instruction fetch and read operations, if the Flash output data is FFFFh, FFFFh by-passes the cipher block 703 and is dispatched to the decoder or the destination register. Alternatively, if the cipher block 703 output is FFFFh, the cipher data is discarded. The Flash memory 106 output data by-passes the cipher block 703 and is dispatched to the decoder or the destination register.

5. Cipher Operation

Figure 10:
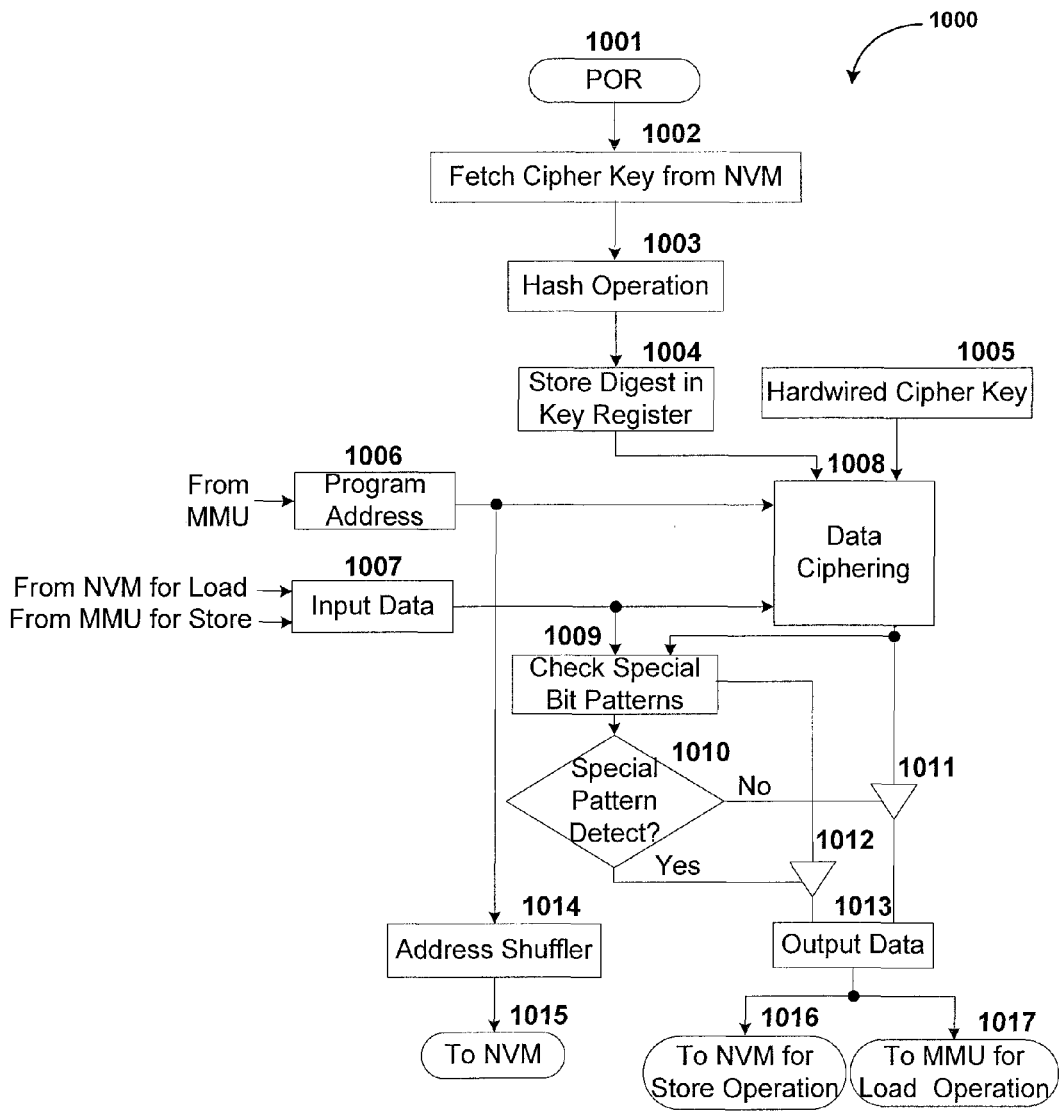
FIG. 10 is a flow diagram illustrating operation of the cipher according to various embodiments of the invention.

FIG. 10 is a flow diagram 1000, illustrating the cipher operation for various embodiments of the present invention. Following a POR 1001, the cipher key is fetched 1002 from the nonvolatile memory 106. The cipher key is then processed through a hash operation 1003, with the resulting digest stored in the key register 1005. This digest is then presented to data ciphering 1008, along with inputs from the hardware cipher key 1005, program address 1006 from the MMU 103, and input data 1007. The input data 1007 and output of data ciphering 1008 is then checked for special patterns 1009, 1010, 1101, 1012. If any special patterns are detected, input data is used, bypassing the ciphering operation. Otherwise the ciphered data is coupled to the nonvolatile memory 106 or the MMU 103. See steps output data 1013, to NVM for store operation 1016, to MMU for load operation 1017. Concurrently, the address shuffler 1014 is scrambling the program addresses.

The foregoing description of the invention has been described for purposes of clarity and understanding. It is not intended to limit the invention to the precise form disclosed. Various modifications may be possible within the scope and equivalence of the appended claims.

We claim:

1. A hardware cipher comprising:
    a hash block that receives bi-directional data from a memory management unit, the hash block provides fast compression of a pseudorandom sequence of a cipher key for key generation;
    an address bit shuffler providing scrambled memory locations;
    a cipher block coupled to the memory management unit, the cipher block providing ciphering and deciphering functions;
    a checker coupled to the cipher block and the memory management unit via a bi-directional data bus, the checker provides special data pattern management; and
    registers coupled to the cipher block, the registers are configured to store key sequences, wherein cryptographic operations are executed in parallel with a run time of a processing unit to reduce latency.

2. The hardware cipher of claim 1 wherein the
    hash block is coupled to receive data from a nonvolatile memory and create a data digest based upon the pseudorandom sequence of the cipher key; the hardware cipher further comprising:
    a scram register coupled to receive data from the hash block, the scram register generates an intermediate key stream resulting from further manipulation of the data digest; and
    the address bit shuffler coupled to receive an address input and a control input coupled from the memory management unit, the address bit shuffler comprising an address output coupled to the nonvolatile memory, the address bit shuffler scrambles nonvolatile memory address locations; the
    cipher block being coupled to receive data coupled from the scram register and being coupled to the memory management unit, the nonvolatile memory, and the checker via the bi-directional data bus, the cipher block further generating a bit stream of ciphering plain text data and deciphering cipher text data,
    wherein the cipher receives the cipher key from the nonvolatile memory.

3. A method for securing content within a microcontroller, the method comprising:
    storing a first set of data received from a first user within a first memory segment of a microcontroller;
    associating a first set of access rights for the first set of stored data;
    storing a second set of data received from a second user within a second memory segment memory of the microcontroller;
    associating a second set of access rights for the second set of stored data, the first and second memory segments each corresponding to one privilege register in an access control comprised in the microcontroller;
    storing a value of a size of each memory segment during a memory segment initialization, wherein the value of the size of the memory segment having a lower privilege level is programmed in the memory segment that has a privilege level that is one level above that of the memory segment having the lower privilege level; and
    protecting the first and second set of access rights by using a safety procedure.

4. The method of claim 3 further comprising:
    storing the first set of data, associated with the first access rights, and the second set of data associated with the second access rights in different segments of a nonvolatile memory; and
    controlling the access to the memory segments based upon the access rights of a user,
    wherein access rights are enforced by hardware coupled with a memory management unit and program routines residing in a utility ROM.

5. A method of protecting data in a microcontroller comprising:
    providing a cipher key from a nonvolatile memory;
    hashing the cipher key having a pseudorandom sequence into a data digest that represents a cryptographic transformation of the cipher key;
    storing the data digest in a register;
    providing key sequences to couple the data digest to a cipher block;
    encrypting an address and associated data using the key sequence such that a ciphered bit stream is generated;
    comparing the associated data of the cipher block to detect a presence of a special pattern; and
    wherein the address is shuffled and stored in the nonvolatile memory, and
    wherein all cryptographic operations are executed in parallel with a processor unit run time.

6. The method of claim 5, wherein the special pattern that cannot be properly maintained with the nonvolatile memory, the method further comprising:
    in response to the special pattern being detected, the associated data is stored within a flash memory; and in response to the special pattern not being detected, the cipher bit stream is stored.

7. The method of claim 5, further comprising:
determining for write operations if input data of the associated data is the special pattern, if the input data is the special pattern then by-passing the cipher block and is programmed to the nonvolatile memory;
determining for write operations if output data of the associated data is the special pattern, if the output data is the special pattern then the ciphered bit stream is discarded and the input data of the associated data by-passes the cipher block and is programmed into the nonvolatile memory;
determining for read operations if output data of the nonvolatile memory is a special pattern, if the output data is the special pattern then by-passing the cipher block and is dispatched to a destination; and
determining for read operations if output data of deciphered data is the special pattern, if the output data is the special pattern then a deciphered bit stream is discarded and the output data of the nonvolatile memory by-passes the cipher block and is dispatched to the destination.

8. The method of claim 3, further comprising transferring the value of the size of each memory segment to the corresponding privilege register in case of power-on reset.

9. The method of claim 3, wherein the safety procedure comprises checking arguments of a system library before raising a current privilege level, wherein the safety procedure is performed in an atomic fashion using two neighboring privilege registers.

10. The method of claim 3, wherein the value of the size of the memory segment having a lower privilege level is programmed in the memory segment that has a privilege level that is one level above that of the memory segment having the lower privilege level.

* * * * *